UNITED STATES PATENT OFFICE.

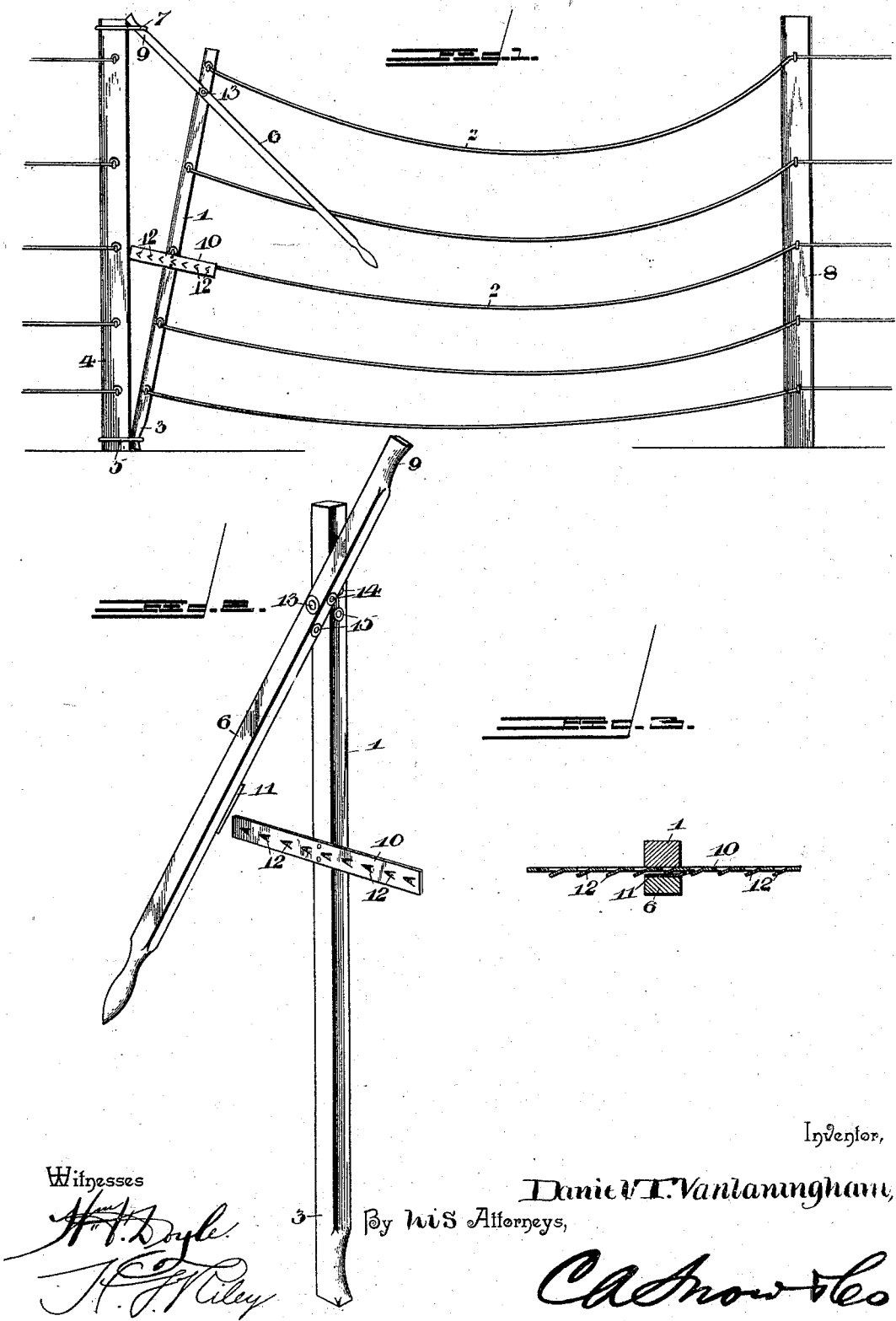

DANIEL T. VANLANINGHAM, OF NOVINGER, MISSOURI.

WIRE-FENCE GATE.

SPECIFICATION forming part of Letters Patent No. 558,127, dated April 14, 1896.

Application filed December 31, 1895. Serial No. 573,926. (No model.)

*To all whom it may concern:*

Be it known that I, DANIEL T. VANLANINGHAM, a citizen of the United States, residing at Novinger, in the county of Adair and State of Missouri, have invented a new and useful Wire-Fence Gate, of which the following is a specification.

The invention relates to improvements in wire-fence gates.

The object of the invention is to provide a simple, inexpensive, and efficient wire-fence gate adapted to enable a portion of a wire fence to be rapidly taken down to provide a passage-way for farm machinery which is too wide for gates of the ordinary construction and capable of enabling the portion of fence taken down to be readily replaced and the wires thereof to be readily stretched to the desired tension.

The invention consists in the construction and novel combination and arrangement of parts hereinafter fully described, illustrated in the accompanying drawings, and pointed out in the claims hereto appended.

In the drawings, Figure 1 is a side elevation of a portion of a wire fence provided with a gate constructed in accordance with this invention. Fig. 2 is a detail perspective view of the gate mechanism. Fig. 3 is a detail sectional view illustrating the manner of locking the wires at the desired tension.

Like numerals of reference denote corresponding parts in all the figures of the drawings.

1 designates an attachment-bar having a series of fence-wires 2 secured to it in any suitable manner. The lower end 3 of the attachment-bar is detachably connected with a fence-post 4 by engaging a wire loop 5 or the like, and a locking-lever 6 is fulcrumed on the attachment-bar at the upper end thereof and engages a loop 7 of the post 4, whereby it is detachably connected with the latter.

The fence-post 4 may be arranged any desired distance from a fence-post 8, and the horizontal fence-wires 2, extending across the space between the fence-post, are adapted to be taken down to provide a gateway for the passage of farm machinery, vehicles, or the like. The lower end 3 of the attachment-bar is recessed and rounded to engage the lower loop 5 securely, and the upper end 9 of the locking-lever is similarly recessed and rounded.

The lower or inner end of the locking-lever is shaped into a handle, and it is secured at any desired adjustment to retain the fence-wires 2 at the desired tension by a rack-bar 10, secured horizontally to the attachment-bar and adapted to be engaged by a plate 11, carried by the locking-lever.

The plate 11 has one of its edges bent at a slight angle, and is thus adapted to engage any one of a series of triangular teeth 12, which are struck up from the rack-bar 10.

When it is desired to open the gate, the lever is disengaged from the rack-bar and swung away from the post 4. Its upper end is then disengaged from the upper loop 7 and the lower end of the attachment-bar is disengaged from the lower loop. The fence-wires 2 are in this manner entirely disengaged from the fence-post 4, and an opening is provided in the fence. The gate is readily closed by engaging the lower end of the attachment-bar and the upper end of the lever with the loops 5 and 7 and then locking the lever at the desired adjustment. The lever is fulcrumed on the attachment-bar by means of the fastening device 13, and the two parts may be strengthened by fastening devices 14 and 15, located above and below the pivot and provided with suitable heads or flanges to prevent the lever and the attachment-bar from splitting at the pivotal point.

It will be seen that the fence-gate is exceedingly simple and inexpensive in construction, that it is easily manipulated, and that an efficient gate may be provided in a wire fence at any desired place.

Changes in the form, proportion, and minor details of construction may be resorted to without departing from the principle or sacrificing any of the advantages of the invention.

What I claim is—

1. In a wire-fence gate, the combination with a fence-post, of an attachment-bar detachably connected at one end to the fence-post, a locking-lever fulcrumed near the other end of the attachment-bar and detachably engaging the fence-post, and a rack-bar mounted on the attachment-bar and adapted to be engaged by the locking-lever whereby the latter is secured at any desired adjustment, substantially as described.

2. In a wire-fence gate, the combination with a fence-post, of an attachment-bar having a series of fence-wires secured to it and detachably connected with the fence-post at one end, a locking-lever fulcrumed near the attachment-bar at the other end thereof and detachably connected with the fence-post, a rack-bar mounted on the attachment-bar and provided with a series of triangular teeth formed integral with the rack-bar, and a plate carried by the locking-lever and adapted to engage the teeth, substantially as described.

In testimony that I claim the foregoing as my own I have hereto affixed my signature in the presence of two witnesses.

DANIEL T. VANLANINGHAM.

Witnesses:
C. A. HAMILTON,
JACOB D. SHAFER.